(12) United States Patent
Duan et al.

(10) Patent No.: US 10,306,518 B2
(45) Date of Patent: May 28, 2019

(54) CIRCUIT SWITCHED SERVICE PROCESSING METHOD AND TERMINAL

(71) Applicant: Huawei Technologies Co., Ltd., Shenzhen (CN)

(72) Inventors: Xiaoyan Duan, Beijing (CN); Bo Zhang, Beijing (CN); Hui Jin, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 15/514,070

(22) PCT Filed: Sep. 25, 2014

(86) PCT No.: PCT/CN2014/087381
§ 371 (c)(1),
(2) Date: Mar. 24, 2017

(87) PCT Pub. No.: WO2016/045029
PCT Pub. Date: Mar. 31, 2016

(65) Prior Publication Data
US 2017/0295521 A1    Oct. 12, 2017

(51) Int. Cl.
*H04W 4/00* (2018.01)
*H04W 36/00* (2009.01)
(Continued)

(52) U.S. Cl.
CPC ....... *H04W 36/0022* (2013.01); *H04W 36/14* (2013.01); *H04W 48/18* (2013.01); *H04W 52/0225* (2013.01); *H04W 36/245* (2013.01); *H04W 36/36* (2013.01); *Y02D 70/00* (2018.01); *Y02D 70/1242* (2018.01); *Y02D 70/1262* (2018.01)

(58) Field of Classification Search
CPC . H04W 36/0022; H04W 36/14; H04W 48/18; H04W 52/0225
USPC ........................................................ 370/328
See application file for complete search history.

(56) References Cited

U.S. PATENT DOCUMENTS

| 8,412,190 B1 | 4/2013 | Moisanen et al. |
| 2012/0071163 A1 | 3/2012 | Klingenbrunn et al. |

(Continued)

FOREIGN PATENT DOCUMENTS

| CN | 103491586 A | 1/2014 |
| CN | 103634855 A | 3/2014 |

(Continued)

OTHER PUBLICATIONS

3rd Generation Partnership Project; Technical Specification Group Core Network and Terminals; Mobile radio interface layer 3; Supplementary services specification; General aspects (Release 11), 3GPP TS 24.010 V 11.0.0, Sep. 2012, 31 pages.

(Continued)

*Primary Examiner* — Sai Ming Chan
(74) *Attorney, Agent, or Firm* — Slater Matsil, LLP

(57) ABSTRACT

A method includes when a terminal needs to execute a circuit switched service again after completing the execution of the circuit switched service once, the terminal executes the circuit switched service again instead of immediately returning to a first network, and then returns to the first network when a preset condition is met.

20 Claims, 7 Drawing Sheets

(51) Int. Cl.
*H04W 36/14* (2009.01)
*H04W 48/18* (2009.01)
*H04W 52/02* (2009.01)
H04W 36/24 (2009.01)
H04W 36/36 (2009.01)

(56) References Cited

U.S. PATENT DOCUMENTS

| | | | | |
|---|---|---|---|---|
| 2012/0218889 | A1* | 8/2012 | Watfa | H04W 60/04 |
| | | | | 370/230 |
| 2013/0329567 | A1* | 12/2013 | Mathias | H04W 36/30 |
| | | | | 370/242 |
| 2014/0079021 | A1* | 3/2014 | Hsu | H04W 36/0022 |
| | | | | 370/331 |
| 2014/0247730 | A1 | 9/2014 | Thota et al. | |

FOREIGN PATENT DOCUMENTS

| | | |
|---|---|---|
| CN | 103916933 A | 7/2014 |
| WO | 2013184342 A1 | 12/2013 |

OTHER PUBLICATIONS

Nokia Corporation "Call Independent Supplementary Services with CSFB", SA WG2 Meeting #100, S2-134408, Nov. 11-15, 2013, San Francisco, USA, 2 pages.

* cited by examiner

CIRCUIT SWITCHED SERVICE PROCESSING METHOD AND TERMINAL

CROSS-REFERENCE TO RELATED APPLICATIONS

This application is a national stage of International Application No. PCT/CN2014/087381, filed on Sep. 25, 2014, which is incorporated by reference herein in its entirety.

TECHNICAL FIELD

The present invention relates to the field of communications technologies, and in particular, to a circuit switched service processing method and a terminal.

BACKGROUND

A wireless mobile communications system evolves from a second generation (2G) communications system, for example, a GSM (Global System for Mobile Communication), and a third generation (3G) communications system, for example, a UMTS (Universal Mobile Telecommunications System) into a fourth generation (4G) communications system. The 4G communications system uses an LTE (Long Term Evolution) access technology, where an access network of the 4G communications system is referred to as an E-UTRAN (Evolved Universal Terrestrial Radio Access Network)

An LTE network is a packet switched (PS for short) network, and cannot provide a circuit switched (CS for short) service, and a circuit switched fallback (CSFB for short) is used as a solution to the circuit switched service in the LTE network. A main idea of the CSFB is that a terminal camps on the E-UTRAN, and when the terminal executes the circuit switched service, the terminal falls back from the LTE network to the 2G network or the 3G network, and the terminal completes the circuit switched service in the 2G network or the 3G network. A specific process is as follows.

When the terminal needs to initiate the circuit switched service, the terminal first falls back from the LTE network to the 2G network or the 3G network, and the terminal returns to the LTE network after completing the execution of the circuit switched service once. If the terminal continues to initiate the circuit switched service again, the terminal needs to fall back from the LTE network to the 2G network or the 3G network again, and the terminal returns to the LTE network again after completing the execution of the circuit switched service this time. If the terminal needs to initiate the circuit switched service multiple times within a preset time period, the terminal needs to execute an operation of falling back from the LTE network to the 2G network or the 3G network multiple times, and execute an operation of returning from the 2G network or the 3G network to the LTE network multiple times. Therefore, there are disadvantages that power consumption of the terminal is relatively large and a delay of the circuit switched service is relatively long.

In conclusion, currently, in a process of processing the circuit switched service by the terminal located in the LTE network, there are the disadvantages that the power consumption of the terminal is relatively large and the delay of the circuit switched service is relatively long.

SUMMARY

Embodiments of the present invention provide a circuit switched service processing method and a terminal, which are used to resolve existing disadvantages that power consumption of a terminal is relatively large and a delay of a circuit switched service is relatively long.

According to a first aspect, a circuit switched service processing method is provided, including starting, by a terminal, a timer after completing execution of a circuit switched service once in a first network that supports the circuit switched service. The method also includes when determining that the circuit switched service needs to be executed again before the timer expires, stopping, by the terminal, the timer, and executing the circuit switched service again in the first network. Additionally, the method includes resetting, by the terminal, the timer after completing the execution of the circuit switched service again and when determining that a preset condition is met, returning, by the terminal, to a second network that does not support the circuit switched service.

With reference to the first aspect, in a first possible implementation manner, after the determining, by the terminal, that the circuit switched service needs to be executed again before the timer expires, and before the executing, by the terminal, the circuit switched service again, further includes: recording, by the terminal, a quantity of delay times once; or after the completing, by the terminal, the execution of the circuit switched service again, and before the returning, by the terminal, to the second network that does not support the circuit switched service, further includes: recording, by the terminal, a quantity of delay times once.

With reference to the first aspect or the first possible implementation manner of the first aspect, in a second possible implementation manner, the preset condition includes at least one of the following: the recorded quantity of delay times reaches a preset quantity of delay times, or duration recorded by the timer reaches preset delay duration; where the preset quantity of delay times refers to a quantity of times that the circuit switched service is allowed to be executed in the first network after the terminal completes the execution of the circuit switched service once and before the terminal returns to the second network.

With reference to the first aspect and either of the first and the second possible implementation manners of the first aspect, in a third possible implementation manner, before the starting, by a terminal, a timer, further includes: determining, by the terminal, that a type of the terminal meets a preset type; or determining, by the terminal, that the second network does not support at least one of a packet switched voice service or a supplementary service; or determining, by the terminal, that a service type of the circuit switched service is a supplementary service.

With reference to the second possible implementation manner of the first aspect, in a fourth possible implementation manner, before the starting, by a terminal, a timer, further includes: determining, by the terminal, at least one of the preset delay duration or the preset quantity of delay times.

With reference to any one of the second to the fourth possible implementation manners of the first aspect, in a fifth possible implementation manner, the starting, by a terminal, a timer includes: starting, by the terminal, the timer according to a received message that carries a delay instruction, where the delay instruction is used to instruct the terminal to delay returning to the second network.

With reference to the fifth possible implementation manner of the first aspect, in a sixth possible implementation manner, the delay instruction includes one or any combination of the preset delay duration or the preset quantity of delay times.

With reference to the first aspect or the sixth possible implementation manner of the first aspect, in a seventh possible implementation manner, before the terminal executes the circuit switched service again, further includes: sending, by the terminal, a circuit switched service request message to a mobile switching center server, where the circuit switched service request message carries a circuit switched fallback instruction.

According to a second aspect, a circuit switched service processing method is provided, including starting, by a terminal, a timer after completing execution of a circuit switched service once in a first network that supports the circuit switched service and executing, by the terminal, the circuit switched service again in the first network when determining that the circuit switched service needs to be executed again before the timer expires. The method also includes after completing the execution of the circuit switched service again and when determining that the timer expires, returning, by the terminal, to a second network that does not support the circuit switched service.

With reference to the second aspect, in a first possible implementation manner, before the starting, by a terminal, a timer, further includes: determining, by the terminal, that a type of the terminal meets a preset type; or determining, by the terminal, that the second network does not support at least one of a packet switched voice service or a supplementary service; or determining, by the terminal, that a service type of the circuit switched service is a supplementary service.

With reference to the second aspect or the first possible implementation manner of the second aspect, in a second possible implementation manner, before the starting, by a terminal, a timer, further includes: determining, by the terminal, preset delay duration.

With reference to the second aspect and either of the first and the second possible implementation manners of the second aspect, in a third possible implementation manner, the starting, by a terminal, a timer includes: starting, by the terminal, the timer according to a received message that carries a delay instruction, where the delay instruction is used to instruct the terminal to delay returning to the second network.

With reference to the third possible implementation manner of the second aspect, in a fourth possible implementation manner, the delay instruction includes the preset delay duration.

With reference to the second aspect and any one of the first to the third possible implementation manners of the second aspect, in a fourth possible implementation manner, before the terminal executes the circuit switched service again, further includes: sending, by the terminal, a circuit switched service request message to a mobile switching center server, where the circuit switched service request message carries a circuit switched fallback instruction.

According to a third aspect, a terminal is provided, including: a processing unit, configured to execute a circuit switched service in a first network that supports the circuit switched service; a starting unit, configured to start a timer after the processing unit completes the execution of the circuit switched service once in the first network; a determining unit, configured to: after the starting unit starts the timer, determine whether the circuit switched service needs to be executed again before the timer expires; a triggering unit, configured to: when the determining unit determines that the circuit switched service needs to be executed again before the timer expires, stop the timer, and trigger the processing unit to execute the circuit switched service again in the first network; a resetting unit, configured to reset the timer after the processing unit competes the execution of the circuit switched service again; and a returning unit, configured to: when it is determined that a preset condition is met, return to a second network that does not support the circuit switched service.

With reference to the third aspect, in a first possible implementation manner, further includes: a recording unit, where the recording unit is configured to record a quantity of delay times once after the determining unit determines that the circuit switched service needs to be executed again before the timer expires, and before the processing unit executes the circuit switched service again; or the recording unit is configured to record a quantity of delay times once after the processing unit completes the execution of the circuit switched service again and before the returning unit returns to the second network that does not support the circuit switched service.

With reference to the third aspect or the first possible implementation manner of the third aspect, in a second possible implementation manner, the preset condition includes at least one of the following: the recorded quantity of delay times reaches a preset quantity of delay times, or duration recorded by the timer reaches preset delay duration; where the preset quantity of delay times refers to a quantity of times that the circuit switched service is allowed to be executed in the first network after the terminal completes the execution of the circuit switched service once and before the terminal returns to the second network.

With reference to the third aspect and either of the first and the second possible implementation manners of the third aspect, in a third possible implementation manner, before the starting unit starts the timer, the determining unit is further configured to: determine that a type of the terminal meets a preset type; or determine that the second network does not support at least one of a packet switched voice service or a supplementary service; or determine that a service type of the circuit switched service is a supplementary service.

With reference to the second or the third possible implementation manner of the third aspect, in a fourth possible implementation manner, before the starting unit starts the timer, the determining unit is further configures to: determine at least one of the preset delay duration or the preset quantity of delay times.

With reference to the second to the fourth possible implementation manners of the third aspect, in a fifth possible implementation manner, the starting unit is specifically configured to: after the processing unit completes the execution of the circuit switched service once in the first network, start the timer according to a received message that carries a delay instruction, where the delay instruction is used to instruct the terminal to delay returning to the second network.

With reference to the fifth possible implementation manner of the third aspect, in a sixth possible implementation manner, the delay instruction includes one or any combination of the preset delay duration or the preset quantity of delay times.

With reference to the third aspect or the sixth possible implementation manner of the third aspect, in a seventh possible implementation manner, further includes: a sending unit, where the sending unit is configured to send a circuit switched service request message to a mobile switching center server, where the circuit switched service request message carries a circuit switched fallback instruction.

According to a fourth aspect, a terminal is provided, including: a processing unit, configured to complete execution of a circuit switched service once in a first network that supports the circuit switched service; a starting unit, configured to start a timer after the processing unit completes the execution of the circuit switched service in the first network; a determining unit, configured to: after the starting unit starts the timer, determine whether the circuit switched service needs to be executed again before the timer expires; a triggering unit, configured to: when the determining unit determines that the circuit switched service needs to be executed again before the timer expires, trigger the processing unit to execute the circuit switched service again in the first network; and a returning unit, configured to: when it is determined that the timer expires, return to a second network that does not support the circuit switched service.

With reference to the fourth aspect, in a first possible implementation manner, the determining unit is further configured to: determine that a type of the terminal meets a preset type; or determine that the second network does not support at least one of a packet switched voice service or a supplementary service; or determine that a service type of the circuit switched service is a supplementary service.

With reference to the fourth aspect or the first possible implementation manner of the fourth aspect, in a second possible implementation manner, the determining unit is further configured to: determine preset delay duration.

With reference to the fourth aspect and either of the first and the second possible implementation manners of the fourth aspect, in a third possible implementation manner, the starting unit is specifically configured to: after the processing unit completes the execution of the circuit switched service in the first network, start the timer according to a received message that carries a delay instruction, where the delay instruction is used to instruct the terminal to delay returning to the second network.

With reference to the third possible implementation manner of the fourth aspect, in a fourth possible implementation manner, the delay instruction includes the preset delay duration.

With reference to the fourth aspect and any one of the first to the third possible implementation manners of the fourth aspect, in a fourth possible implementation manner, further includes: a sending unit, where the sending unit is configured to send a circuit switched service request message to a mobile switching center server, where the circuit switched service request message carries a circuit switched fallback instruction.

According to a fifth aspect, a terminal is provided, including: a transceiver, a communications bus, a memory, and a processor, where the communications bus is configured to connection and communication among the processor, the transceiver, and the memory; the transceiver is configured to implement communication between the terminal and the outside; the memory is configured to store program code; and the processor is configured to: invoke the program code stored in the memory, and execute the method according to the first aspect and any one of the first to the seventh possible implementation manners of the first aspect.

According to a sixth aspect, a terminal is provided, including: a transceiver, a communications bus, a memory, and a processor, where the communications bus is configured to connection and communication among the processor, the transceiver, and the memory; the transceiver is configured to implement communication between the terminal and the outside; the memory is configured to store program code; and the processor is configured to: invoke the program code stored in the memory, and execute the method according to the second aspect and any one of the first to the fifth possible implementation manners of the second aspect.

In the embodiments of the present invention, after a terminal completes execution of a circuit switched service once in a first network, the terminal camps on the first network for preset delay duration instead of immediately returning to a second network; the terminal may execute the circuit switched service at least one time again within the preset delay duration; and then the terminal returns to the second network when a preset condition is met, which avoids a process in which the terminal first returns from the first network to the second network after completing the execution of the circuit switched service each time, and then the terminal falls back from the second network to the first network for the terminal to execute the circuit switched service again. Therefore, according to the foregoing technical solution, power consumption of the terminal can be reduced and a delay of the circuit switched service can be shortened.

DETAILED DESCRIPTION OF ILLUSTRATIVE EMBODIMENTS

Figure 1A:
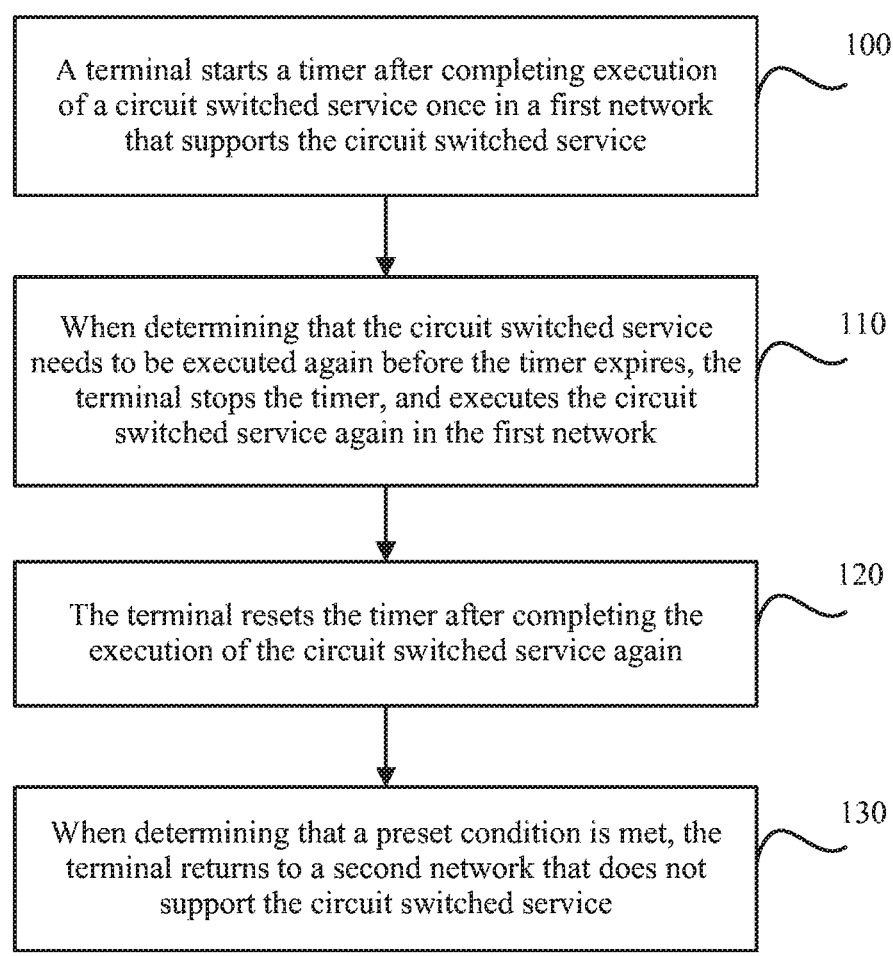
FIG. 1A is a flowchart of circuit switched service processing in an embodiment of the present invention.

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/"

in this specification generally indicates an "or" relationship between the associated objects.

In the following, preferred implementation manners of the present invention are described in detail with reference to the accompanying drawings. It should be understood that the preferred embodiments described herein are merely used to illustrate and explain the present invention, but are not intended to limit the present invention. In addition, the embodiments of the present application and features in the embodiments may be mutually combined in a case in which they do not conflict with each other.

It should be understood that a terminal (for example, a mobile phone) related to this specification includes an access stratum (AS for short) and a non-access stratum (NAS for short).

The following describes the preferred implementation manners of the present invention in detail with reference to the accompanying drawings.

Referring to FIG. IA, in an embodiment of the present invention, a procedure of circuit switched service processing is as follows.

Embodiment 1

Step 100: A terminal starts a timer after completing execution of a circuit switched service once in a first network that supports the circuit switched service.

Step 110: When determining that the circuit switched service needs to be executed again before the timer expires, the terminal stops the timer, and executes the circuit switched service again in the first network.

Step 120: The terminal resets the timer after completing the execution of the circuit switched service again.

Step 130: When determining that a preset condition is met, the terminal returns to a second network that does not support the circuit switched service.

In this embodiment of the present invention, the first network may be an LTE network, and the second network may be a 2G network or a 3G network. Certainly, with development of science and technologies, the first network may be a network of another standard, and details are not described herein. It should be understood that the LTE network is a network that supports LTE, the 2G network is a network that supports 2G, and the 3G network is a network that supports 3G.

In this embodiment of the present invention, the circuit switched service includes a voice call service and a supplementary service.

In this embodiment of the present invention, after the determining, by the terminal, that the circuit switched service needs to be executed again before the timer expires, and before the executing, by the terminal, the circuit switched service again, the procedure further includes the following operation: recording, by the terminal, a quantity of delay times once.

In this case, the quantity of delay times may be recorded before the timer stops or may be recorded after the timer stops.

Alternatively, after the completing, by the terminal, the execution of the circuit switched service again, and before the returning, by the terminal, to the second network that does not support the circuit switched service, the procedure further includes the following: recording, by the terminal, a quantity of delay times once.

In this case, the quantity of delay times may be recorded before the timer is reset or may be recorded after the timer is reset. That is, the terminal in Embodiment 1 needs to record the quantity of delay times once. However, that the terminal records the quantity of delay times may be executed when the terminal determines that the circuit switched service needs to be executed again, or may be executed after the terminal completes the execution of the circuit switched service again. In an actual application, the foregoing two manners may be flexibly applied, and details are not described herein.

In this embodiment of the present invention, optionally, the preset condition includes at least one of the following: the recorded quantity of delay times reaches a preset quantity of delay times, or duration recorded by the timer reaches preset delay duration, where the preset quantity of delay times refers to a quantity of times that the circuit switched service is allowed to be executed in the first network after the terminal completes the execution of the circuit switched service once and before the terminal returns to the second network.

In this embodiment of the present invention, before the terminal starts the timer, the procedure further includes the following operations: determining, by the terminal, that a type of the terminal meets a preset type; or determining, by the terminal, that the second network does not support at least one of a packet switched voice service or a supplementary service; or determining, by the terminal, that a service type of the circuit switched service is a supplementary service.

That is, the foregoing three results of the determining may be conditions for triggering the timer to start. For example, when the terminal determines that the type of the terminal meets the preset type, the terminal starts the timer; when determining that the type of the terminal does not meet the preset type, the terminal returns to the first network. Likewise, if the terminal determines that the second network supports either of the packet switched voice service and the supplementary service, the terminal returns to the first network.

In this embodiment of the present invention, before the terminal starts the timer, the procedure further includes: determining, by the terminal, at least one of the preset delay duration or the preset quantity of delay times.

In this embodiment of the present invention, the terminal starts the timer in multiple manners. Optionally, the terminal may start the timer in the following manner: starting, by the terminal, the timer according to a received message that carries a delay instruction, where the delay instruction is used to instruct the terminal to delay returning to the second network.

In this embodiment of the present invention, the starting, by the terminal, the timer according to a received message that carries a delay instruction may be specifically the following manner: invoking, by the terminal, an access stratum, and starting the timer according to a received message that is sent by a non-access stratum of the terminal and carries a delay instruction.

In this embodiment of the present invention, the message that carries the delay instruction may be a newly constructed message or may be an existing message.

In this embodiment of the present invention, the delay instruction includes one or any combination of the preset delay duration or the preset quantity of delay times, where the preset quantity of delay times refers to a quantity of times that the circuit switched service is allowed to be executed in the first network after the terminal completes the execution of the circuit switched service once and before the terminal returns to the second network.

Optionally, the preset quantity of delay times is 1, 2, or N, where N is a positive integer not equal to 1 (or 2).

The delay instruction may be indicated by assigned values of several designated bits in the message. For example, an assigned value of a bit in the message indicates the preset delay duration, an assigned value of another bit in the message indicates the preset quantity of delay times, and an assigned value of another bit different from the previous two bits in the message indicates a delay of return. It should be understood that a message may carry the assigned values of the three bits at the same time, or a message may carry only at least one of the assigned values of the three bits. For example, a message carries only the assigned value that indicates the delay of return. In addition, a sequence of the three bits is not limited. It should be understood that the foregoing is merely a solution for indicating the delay instruction, and does not constitute any limitation. For example, the delay instruction may indicate at least one of the delay of return, the preset delay duration, or the preset quantity of delay times by using an assigned value of a bit in the message.

Optionally, the terminal may directly set the preset delay duration and the preset quantity of delay times in the access stratum, and the access stratum of the terminal does not need to acquire the foregoing two parameters from the non-access stratum, that is, the terminal may start the timer in the following manner: starting the timer when the preset delay duration and/or the preset quantity of delay times is determined.

The preset quantity of delay times refers to a quantity of times that the circuit switched service is allowed to be executed in the first network after the terminal completes the execution of the circuit switched service once and before the terminal returns to the second network.

For example, the preset delay duration is T seconds. After the terminal starts the timer, if the terminal determines to execute the circuit switched service once when timing duration of the timer is s1 seconds (s1<T), the terminal stops the timer; after the terminal completes the circuit switched service this time, the terminal resets the timer (the timer is timed again); and when determining to execute the circuit switched service this time or completing the circuit switched service this time, the terminal records that the quantity of delay times is 1. Subsequently, if the terminal determines to execute the circuit switched service once when timing duration of the timer is s2 seconds (s2<T), the terminal stops the timer; after the terminal completes the circuit switched service this time, the terminal resets the timer (the timer is timed again); and when determining to execute the circuit switched service this time or completing the circuit switched service this time, the terminal records that the quantity of delay times is 2. By analogy, if the preset quantity of delay times is N, the terminal returns to the LTE network after the recorded quantity of delay times reaches N times and the circuit switched service is completed this time; or if the preset quantity of delay times is N, the terminal resets the timer (the timer is timed again) after completing the circuit switched service for the mth (m<N) time, and if the terminal does not execute the circuit switched service this time before the timer expires, the terminal returns to the LTE network when the timer expires.

In this embodiment of the present invention, before the terminal executes the circuit switched service again, the procedure further includes the following operation: sending, by the terminal, a circuit switched service request message to a mobile switching center server, where the circuit switched service request message carries a circuit switched fallback instruction.

The circuit switched fallback (CSFB for short) instruction may be a circuit switched fallback mobile originating call (CSMO for short) instruction or may be a circuit switched fallback mobile terminating call (CSMT for short) instruction.

In this embodiment of the present invention, the terminal returns to the second network in multiple manners. Optionally, the terminal may return to the second network in the following manner: receiving, by the terminal, a connection release message sent by a network side; and returning, by the terminal, to the second network according to the connection release message.

The connection release message may be a radio resource control (RRC for short) Connection Release message sent by a radio network subsystem (RNS for short), or the connection release message may be a Channel Release message sent by a base station subsystem (BSS for short).

If the RRC Connection Release message or the Channel Release message includes related information for redirecting the terminal to a cell in the second network (for example, frequency information of an E-UTRAN cell), the terminal selects and accesses the E-UTRAN cell when returning to the second network.

If the RRC Connection Release message or the Channel Release message does not include related information for redirecting the terminal to a cell in the second network, the terminal needs to reselect and access an E-UTRAN cell when returning to the second network.

In this embodiment of the present invention, the terminal invokes the access stratum and reads an assigned value of a configuration parameter CSFB_WAIT_ENABLED to determine to enable the procedure in this embodiment of the present invention or to execute a procedure in the prior art, where if CSFB_WAIT_ENABLED=1, the terminal enables the procedure in this embodiment of the present invention, or if CSFB_WAIT_ENABLED=0, the terminal enables the existing procedure.

In conclusion, in this embodiment of the present invention, a circuit switched service processing method is provided, where after a terminal completes execution of a circuit switched service once in a first network, the terminal camps on the first network for preset delay duration instead of immediately returning to a second network; the terminal may execute the circuit switched service at least one time again within the preset delay duration; and then the terminal returns to the second network when a preset condition is met, which avoids a process in which the terminal first returns from the first network to the second network after completing the execution of the circuit switched service each time, and then the terminal falls back from the second network to the first network for the terminal to execute the circuit switched service again. Therefore, according to the foregoing technical solution, power consumption of the terminal can be reduced and a delay of the circuit switched service can be shortened.

Figure 1B:
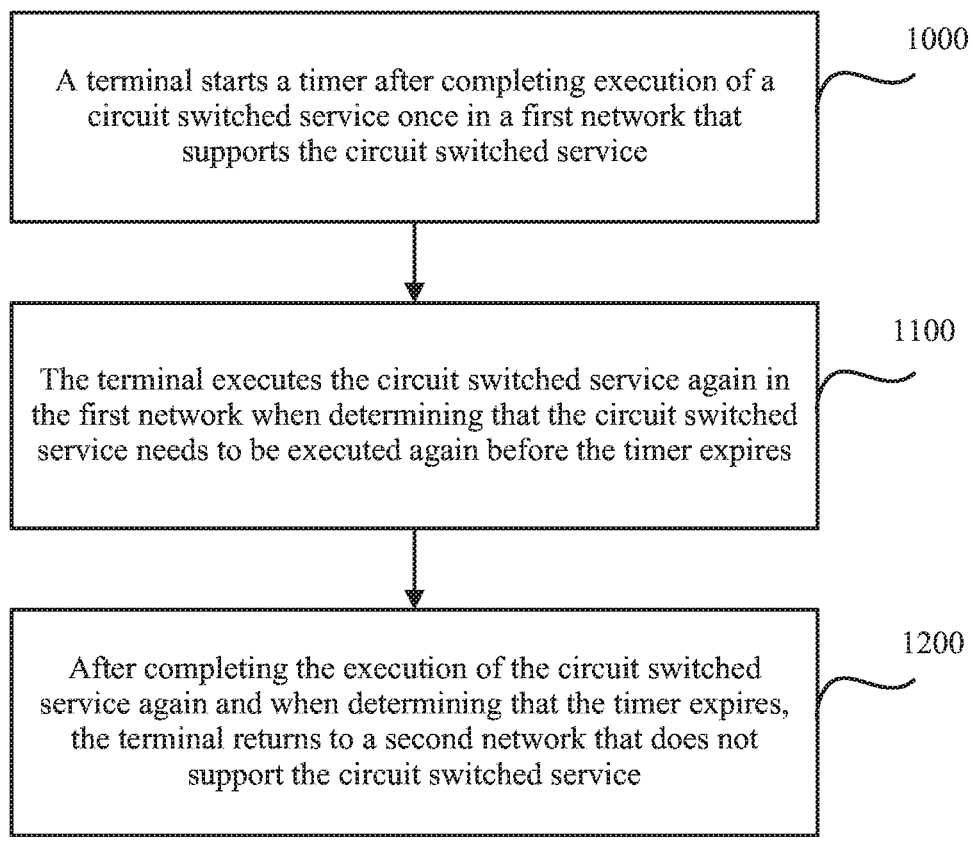
FIG. 1B is a flowchart of circuit switched service processing in an embodiment of the present invention.

Referring to FIG. 1B, in an embodiment of the present invention, another procedure of circuit switched service processing is as follows.

Embodiment 2

Step 1000: A terminal starts a timer after completing execution of a circuit switched service once in a first network that supports the circuit switched service.

Step 1100: The terminal executes the circuit switched service again in the first network when determining that the circuit switched service needs to be executed again before the timer expires.

Step 1200: After completing the execution of the circuit switched service again and when determining that the timer expires, the terminal returns to a second network that does not support the circuit switched service.

In this embodiment of the present invention, the first network may be an LTE network, and the second network may be a 2G network or a 3G network. Certainly, with development of science and technologies, the first network may be a network of another standard, and details are not described herein. It should be understood that the LTE network is a network that supports LTE, the 2G network is a network that supports 2G, and the 3G network is a network that supports 3G.

In this embodiment of the present invention, the circuit switched service includes a voice call service and a supplementary service.

Before the terminal starts the timer, the procedure further includes the following operations: determining, by the terminal, that a type of the terminal meets a preset type; or determining, by the terminal, that the second network does not support at least one of a packet switched voice service or a supplementary service; or determining, by the terminal, that a service type of the circuit switched service is a supplementary service.

That is, the foregoing three results of the determining may be conditions for triggering the timer to start. For example, when the terminal determines that the type of the terminal meets the preset type, the terminal starts the timer; when determining that the type of the terminal does not meet the preset type, the terminal returns to the first network. Likewise, if the terminal determines that the second network supports either of the packet switched voice service and the supplementary service, the terminal returns to the first network.

In this embodiment of the present invention, the preset type may be a voice-service-oriented type, and certainly, may be another type, and details are not described herein.

In this embodiment of the present invention, before the terminal starts the timer, the procedure further includes the following operation: determining, by the terminal, preset delay duration.

In this embodiment of the present invention, the terminal starts the timer in multiple manners. Optionally, the terminal may start the timer in the following manner: starting, by the terminal, the timer according to a received message that carries a delay instruction, where the delay instruction is used to instruct the terminal to delay returning to the second network.

In this embodiment of the present invention, the starting, by the terminal, the timer according to a received message that carries a delay instruction may be the following manner: invoking, by the terminal, an access stratum, and starting the timer according to a received message that is sent by a non-access stratum of the terminal and carries a delay instruction.

In this embodiment of the present invention, optionally, the delay instruction includes the preset delay duration.

In this embodiment of the present invention, before the terminal executes the circuit switched service again, the procedure further includes the following operation: sending, by the terminal, a circuit switched service request message to a mobile switching center server, where the circuit switched service request message carries a circuit switched fallback instruction.

In this embodiment of the present invention, the circuit switched fallback instruction may be a circuit switched fallback mobile originating call instruction, or may be a circuit switched fallback mobile terminating call instruction.

For example, the preset delay duration is T seconds. After the terminal starts the timer, and when timing duration of the timer is s1 seconds (s1<T), if the terminal determines to execute the circuit switched service once, the terminal executes the circuit switched service this time, and after the terminal completes the circuit switched service this time, if timing duration of the timer is less than T seconds in this case (that is, the timer does not expire), the terminal waits for a next circuit switched service and does not stop the timer; when timing duration of the timer is s2 seconds (s2<T), if the terminal determines to execute the circuit switched service again, the terminal executes the circuit switched service this time, and after the terminal completes the circuit switched service this time, if timing duration of the timer is still less than T seconds in this case (that is, the timer does not expire), the terminal waits for a next circuit switched service and does not stop the timer, and by analogy, until a time recorded by the timer (that is, the timing duration) reaches T seconds, that is, the timer expires.

If the terminal is in a connected state when the timer expires, that is, the terminal is executing the circuit switched service or a radio connection exists between the terminal and an RNS (or a BSS), after completing the circuit switched service that is being executed (if the terminal is executing the circuit switched service), the terminal releases the radio connection according to a connection release message sent by the RNS (or the BSS), and returns to the LTE network. If the terminal is in an idle state when the timer expires, that is, no radio connection exists between the terminal and an RNS (or a BSS), the terminal directly returns to the LTE network.

In Embodiment 2, before the timer expires, the terminal may execute the circuit switched service one or more times. As long as the timer does not expire, the terminal can execute the circuit switched service when the circuit switched service needs to be executed.

Figure 2:
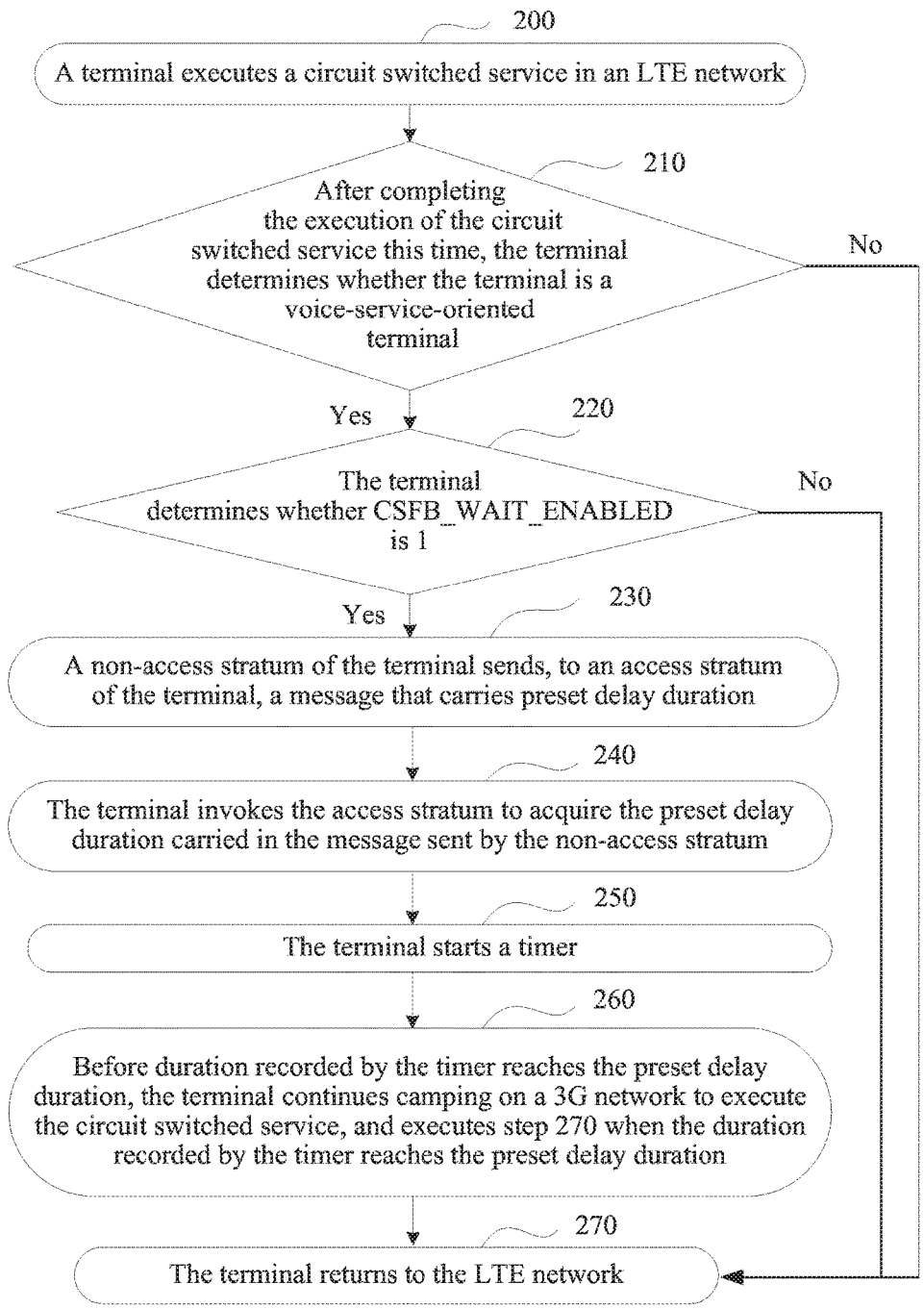
FIG. 2 is an embodiment of circuit switched circuit switched service processing in an embodiment of the present invention.
Figure 3:
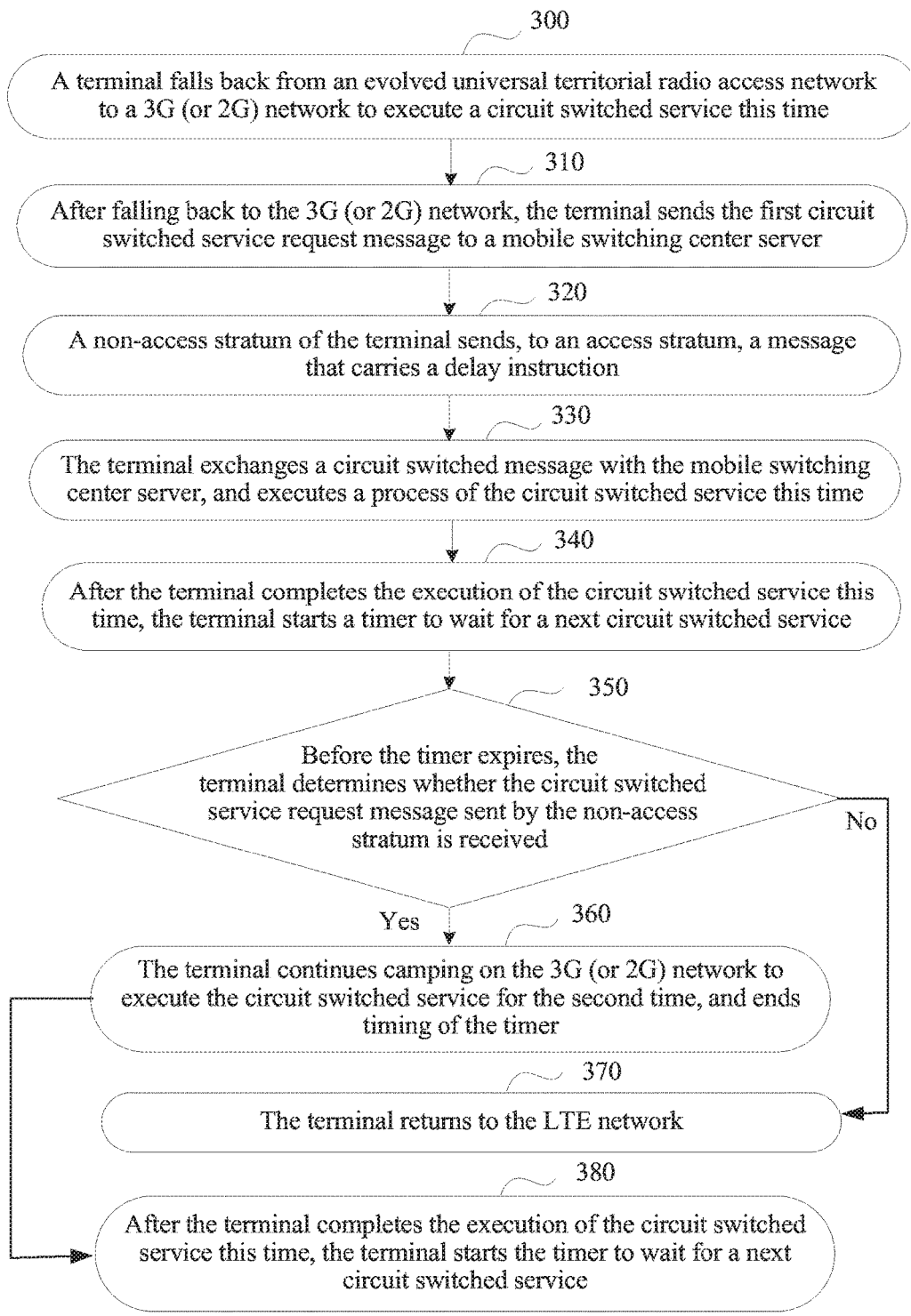
FIG. 3 is another embodiment of circuit switched service processing in an embodiment of the present invention.
Figure 4:
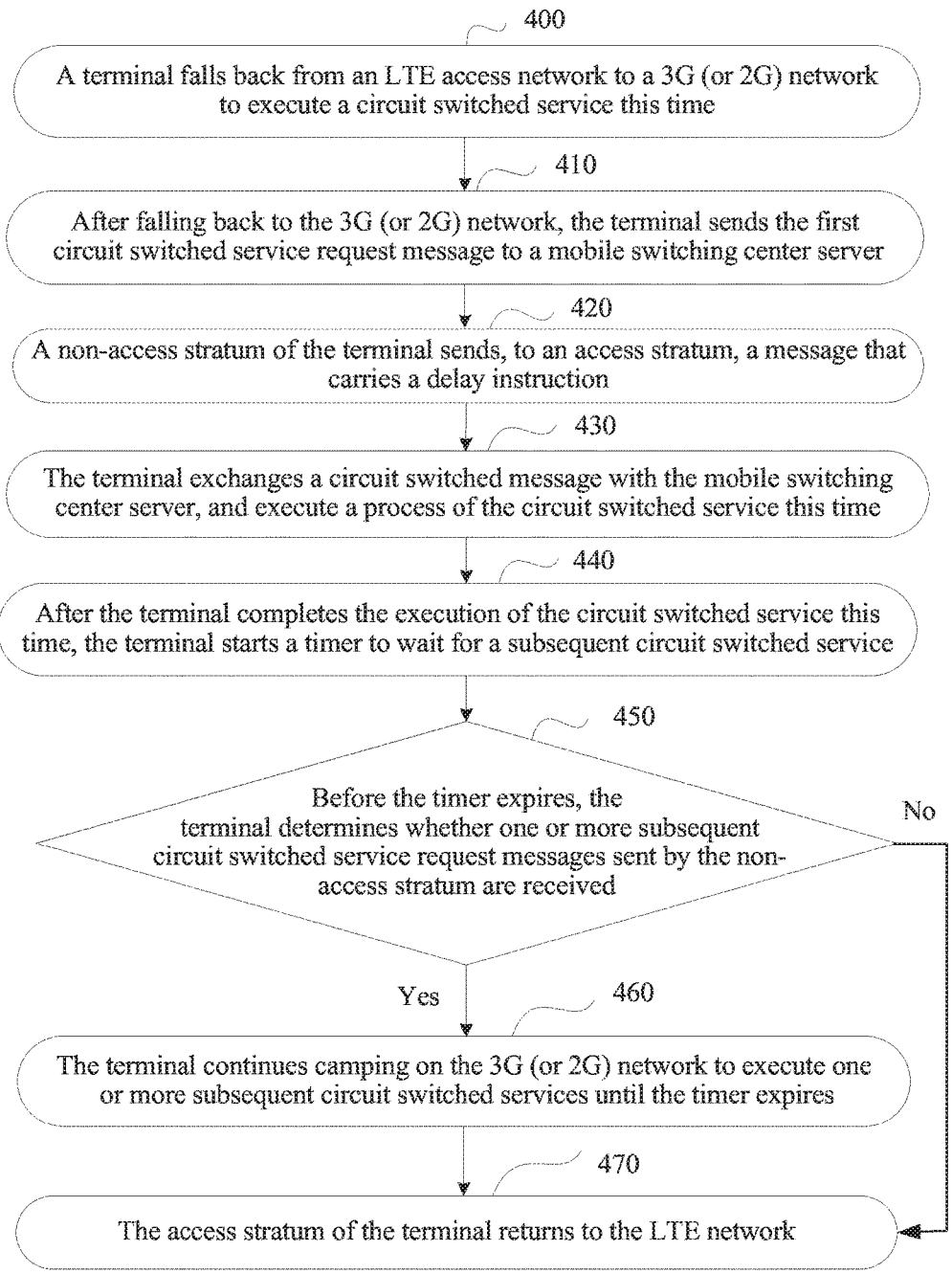
FIG. 4 is another embodiment of circuit switched service processing in an embodiment of the present invention.

To better understand this embodiment of the present invention, the following provides a specific application scenario and makes a further detailed description about a process of circuit switched service processing, as shown in FIG. 2.

Embodiment 3

Step 200: A terminal executes a circuit switched service in an LTE network.

Step 210: After completing the execution of the circuit switched service this time, the terminal determines whether the terminal itself is a voice-service-oriented terminal, and if yes, performs step 220; otherwise, performs step 270.

Step 220: The terminal determines whether CSFB_WAIT_ENABLED is 1, and if yes, performs step 230; otherwise, performs step 270.

Step 230: A non-access stratum of the terminal sends, to an access stratum of the terminal, a message that carries preset delay duration.

Step 240: The terminal invokes the access stratum to acquire the preset delay duration carried in the message sent by the non-access stratum.

Step 250: The terminal starts a timer.

Step 260: Before duration recorded by the timer reaches the preset delay duration, the terminal continues camping on a 3G network to execute the circuit switched service, and performs step 270 when the duration recorded by the timer reaches the preset delay duration.

In step 260, as long as the duration recorded by the timer does not reach the preset delay duration, the terminal can execute the circuit switched service if the circuit switched service needs to be executed.

Step 270: The terminal returns to the LTE network.

In this embodiment, after completing execution of a circuit switched service this time in a 3G network, the terminal continues camping on the 3G network to execute the circuit switched service instead of returning to an LTE network; the terminal does not immediately return to the LTE network after completing the execution of the circuit switched service each time before a timer expires; and the terminal returns to the LTE network only when duration recorded by the timer reaches preset delay duration. Therefore, power consumption of the terminal is reduced and a delay of the circuit switched service is shortened.

Embodiment 4

Step 300: A terminal falls back from an E-UTRAN (Evolved Universal Terrestrial Radio Access Network) (an LTE access network) to a 3G (or 2G) network to execute a circuit switched service this time, where the circuit switched service may be a supplementary service or a voice call service.

Step 310: After falling back to the 3G (or 2G) network, the terminal sends the first circuit switched service request message to a mobile switching center (MSC for short) server.

Step 320: A non-access stratum of the terminal sends, to an access stratum, a message that carries a delay instruction.

The delay instruction is used to instruct the terminal to return to the LTE network.

In step 320, the terminal invokes the non-access stratum to determine, according to a service type of the circuit switched service currently executed by the terminal, whether to send, to the access stratum, the message that carries the delay instruction. For example, if it is determined that the circuit switched service executed by the terminal is a call-unrelated supplementary service (for example, an unstructured supplementary service data (USSD for short) service), the terminal invokes the non-access stratum to send, to the access stratum, the message that carries the delay instruction.

The delay instruction may be a preset identifier, or may be preset delay duration, or may be a preset quantity of delay times, where the preset delay duration is used to indicate maximum duration of waiting for a next circuit switched service by the access stratum of the terminal after completing the circuit switched service this time and before returning to the LTE network. For example, if the preset delay duration is 30 seconds, it indicates that the terminal waits 30 seconds after completing the circuit switched service this time, and if there is no new circuit switched service to be executed, the terminal returns to the LTE network.

The message that is sent by the non-access stratum to the access stratum and carries the delay instruction may carry only the preset identifier that is used to indicate a delay of return. In this case, the access stratum may set the preset delay duration by itself.

The delay instruction may further include the preset quantity of delay times, where the preset quantity of delay times refers to a quantity of times that the circuit switched service is allowed to be executed in a first network after the terminal completes the execution of the circuit switched service once and before the terminal returns to the LTE network. Optionally, the preset quantity of delay times is 1, 2, or N, where N is a positive integer not equal to 1 (or 2).

In this embodiment of the present invention, the terminal may determine, according to an assigned value of a configuration parameter CSFB_WAIT_ENABLED, to execute the procedure in this embodiment of the present invention or to execute a procedure in the prior art. For example, if CSFB_WAIT_ENABLED=1, the terminal enables the procedure in this embodiment of the present invention, or if CSFB_WAIT_ENABLED=0, the terminal executes the existing procedure.

Step 330: The terminal exchanges a circuit switched message with the MSC Server, and executes a process of the circuit switched service this time.

Step 340: After completing the execution of the circuit switched service this time, the terminal receives an RRC Connection Release message sent by an RNS (or a Channel Release message sent by a BSS), and the terminal starts a timer to wait for a next circuit switched service.

If the RRC Connection Release message sent by the RNS (or the Channel Release message sent by the BSS) includes related information for directing the terminal to the E-UTRAN (for example, information such as a frequency of an E-UTRAN cell), the terminal starts the timer to wait for the next circuit switched service instead of immediately selecting and accessing the E-UTRAN cell (that is, rapidly returning to the E-UTRAN) according to the RRC Connection Release message (or the Channel Release message sent by the BSS).

If the RRC Connection Release message sent by the RNS (or the Channel Release message sent by the BSS) does not include related information for directing the terminal to the E-UTRAN, likewise, the terminal also starts the timer to wait for the next circuit switched service instead of immediately reselecting and accessing an E-UTRAN cell (that is, returning to the E-UTRAN).

In step 320, if the delay instruction carried in the message sent by the non-access stratum of the terminal does not include the preset delay duration, the terminal may invoke the access stratum to set the preset delay duration. For example, the preset delay duration CSFB_WAIT_TIME=30 seconds.

Step 350: Before the timer expires, the terminal determines whether the circuit switched service request message sent by the non-access stratum (that is, the second circuit switched service request message sent by the non-access stratum of the terminal) is received, and if yes, performs step 360; otherwise, performs step 370.

It should be understood that the timer may count down from an initial value to a value greater than or equal to 0, or may count from 0 to a value less than or equal to the preset delay duration. When the timer counts down from the initial value to 0, or counts from o to the preset delay duration, it is considered that the timer expires.

Specifically, the circuit switched service request (CM Service Request) message sent by the non-access stratum of the terminal may carry a CSFB instruction. Although the circuit switched service request message is not actually initiated by using a CSFB process (that is, because the terminal does not return to the LTE network, the terminal does not need to fall back from the LTE network to the 3G (or 2G) network), the circuit switched service request message still carries the CSFB instruction to instruct the MSC Server to send, after the circuit switched service is completed this time, a connection release message that carries the CSFB instruction, and to trigger the RNS (or the BSS) to trigger the terminal to return to the E-UTRAN.

Step 360: The terminal continues camping on the 3G (or 2G) network to execute the circuit switched service for the second time, ends timing of the timer, and performs step 380.

Step 370: The terminal returns to the LTE network.

In step 370, if the RRC Connection Release message sent by the RNS in step 340 (or the Channel Release message sent by the BSS) includes the related information (that is, redirection information) for redirecting the terminal to the E-UTRAN, the terminal selects an E-UTRAN cell according to the redirection information and accesses the selected E-UTRAN cell (that is, rapidly returns to the E-UTRAN); if the RRC Connection Release message sent by the RNS in step 340 (or the Channel Release message sent by the BSS) does not include the related information for redirecting the terminal to the E-UTRAN, the terminal executes a cell reselection process, and selects and accesses an E-UTRAN cell (that is, returns to the E-UTRAN).

Step 380: After completing the execution of the circuit switched service this time, the terminal receives the RRC Connection Release message sent by the RNS (or the Channel Release message sent by the BSS), and the terminal starts the timer to wait for the next circuit switched service.

After the terminal completes the execution of the circuit switched service for the second time, if the preset quantity of delay times is 1, the terminal performs step 370. If the preset quantity of delay times is greater than 1, the terminal records the preset quantity of delay times, and returns to step 340; when the timer expires or the recorded quantity of delay times is the preset quantity of delay times, the terminal performs step 370.

For example, if the preset quantity of delay times is 2, after the terminal completes the execution of the circuit switched service for the second time, the terminal records that the quantity of delay times is 1 and starts the timer; before the timer expires, the terminal receives the third circuit switched service request, the terminal stops timing of the timer, and the terminal executes the circuit switched service for the third time and records that the quantity of delay times is 2; because the recorded quantity of delay times reaches the preset quantity of delay times, the terminal returns to the LTE network.

Embodiment 5

Step 400: A terminal falls back from an E-UTRAN (an LTE access network) to a 3G (or 2G) network to execute a circuit switched service this time.

The circuit switched service may be a supplementary service or a voice call service.

Step 410: After falling back to the 3G (or 2G) network, the terminal sends the first circuit switched service request message to an MSC Server.

Step 420: A non-access stratum of the terminal sends, to an access stratum, a message that carries a delay instruction.

The delay instruction is used to instruct the terminal to return to the LTE network.

In step 420, the terminal may determine, according to a service type of the circuit switched service currently executed by the non-access stratum of the terminal, whether to invoke the non-access stratum to send, to the access stratum, the message that carries the delay instruction. For example, if the terminal determines that the circuit switched service executed by the terminal is a call-unrelated supplementary service (for example, a USSD service), the terminal invokes the non-access stratum to send, to the access stratum, the message that carries the delay instruction.

The delay instruction may be a preset identifier, or may be preset delay duration, where the preset delay duration is used to indicate maximum duration of waiting for a new circuit switched service by the access stratum of terminal after completing the circuit switched service this time and before returning to the LTE network. For example, if the preset delay duration is 30 seconds, it indicates that the terminal waits 30 seconds after completing the circuit switched service this time, and if there is no new circuit switched service to be executed, the terminal returns to the LTE network.

The message that is sent by the non-access stratum to the access stratum and carries the delay instruction may carry only the preset identifier that is used to indicate a delay of return. In this case, the access stratum may set the preset delay duration by itself.

In this embodiment of the present invention, the terminal may determine, according to an assigned value of a configuration parameter CSFB_WAIT_ENABLED, to execute the procedure in this embodiment of the present invention or to execute a procedure in the prior art. For example, if CSFB_WAIT_ENABLED=1, the terminal enables the procedure in this embodiment of the present invention, or if CSFB_WAIT_ENABLED=0, the terminal executes the existing procedure.

Step 430: The terminal exchanges a circuit switched message with the MSC Server, and executes a process of the circuit switched service this time.

Step 440: After completing the execution of the circuit switched service this time, the terminal receives an RRC Connection Release message sent by an RNS (or a Channel Release message sent by a BSS), and the terminal starts a timer to wait for a subsequent circuit switched service.

If the RRC Connection Release message sent by the RNS (or the Channel Release message sent by the BSS) includes related information for redirecting the terminal to the E-UTRAN (for example, information such as a frequency of an E-UTRAN cell), the terminal starts the timer to wait the subsequent circuit switched service instead of immediately selecting and accessing the E-UTRAN cell (that is, rapidly returning to the E-UTRAN) according to the RRC Connection Release message (or the Channel Release message sent by the BSS).

If the RRC Connection Release message sent by the RNS (or the Channel Release message sent by the BSS) does not include the related information for redirecting the terminal to the E-UTRAN, likewise, the terminal also starts the timer to wait for the subsequent circuit switched service instead of immediately reselecting and accessing an E-UTRAN cell (that is, returning to the E-UTRAN).

In step 420, if the delay instruction carried in the message sent by the non-access stratum of the terminal does not include the preset delay duration, the terminal may invoke the access stratum to set the preset delay duration. For example, the preset delay duration CSFB_WAIT_TIME=30 seconds.

Step 450: Before the timer expires, the terminal determines whether one or more subsequent circuit switched service request messages sent by the non-access stratum are received, and if yes, the terminal performs step 460; otherwise, the terminal performs step 470.

It should be understood that the timer may count down from an initial value to a value greater than or equal to 0, or may count from 0 to a value less than or equal to the preset delay duration. When the timer counts down from the initial value to 0, or counts from 0 to the preset delay duration, it is considered that the timer expires.

Specifically, the circuit switched service request (CM Service Request) message sent by the non-access stratum of the terminal may carry a CSFB instruction. Although the circuit switched service request message is not actually initiated by using a CSFB process (that is, because the terminal does not return to LTE, the terminal does not need to fall back from the LTE network to the 3G (or 2G) network), the circuit switched service request message still carries the CSFB instruction to instruct the MSC Server to send, after the circuit switched service is completed this time, a connection release message that carries the CSFB instruction, and to trigger the RNS (or the BSS) to trigger the terminal to return to the E-UTRAN.

Step 460: The terminal continues camping on the 3G (or 2G) network to execute one or more subsequent circuit switched services until the timer expires.

Step 470: The terminal returns to the LTE network.

When the timer expires (for example, the timer counts down from the initial value to 0), if the terminal is in an idle state in this case, that is, a radio connection between the terminal and the RNS (or the BSS) is already released, and if the RRC Connection Release message that is sent by the RNS (or the Channel Release message sent by the BSS) and is received by the terminal last time includes the related information for redirecting the terminal to the E-UTRAN, the terminal selects an E-UTRAN cell according to the redirection information and accesses the selected E-UTRAN cell (that is, rapidly returns to E-UTRAN); if the RRC Connection Release message that is sent by the RNS (or the Channel Release message sent by the BSS) and is received by the terminal last time does not include the related information for redirecting the terminal to the E-UTRAN, the terminal executes a cell reselection process and selects and accesses an E-UTRAN cell (that is, returns to the E-UTRAN).

When the timer expires (for example, the timer counts down from the initial value to 0), if the terminal is in a connected state in this case, that is, the terminal is executing the circuit switched service or a radio connection exists between the terminal and the RNS (or the BSS), the terminal waits for the RRC Connection Release message sent by the RNS (or the Channel Release message sent by the BSS). When the terminal receives the RRC Connection Release message by the RNS (or the Channel Release message sent by the BSS), if the RRC Connection Release message sent by the RNS (or the Channel Release message sent by the BSS) includes the related information for redirecting the terminal to the E-UTRAN, the terminal selects an E-UTRAN cell according to the redirection information, and accesses the selected E-UTRAN cell (that is, rapidly returns to the E-UTRAN); if the RRC Connection Release message sent by the RNS (or the Channel Release message sent by the BSS) does not include the related information for redirecting the terminal to the E-UTRAN, the terminal executes a cell reselection process and selects and accesses an E-UTRAN cell (that is, returns to the E-UTRAN).

Figure 5A:
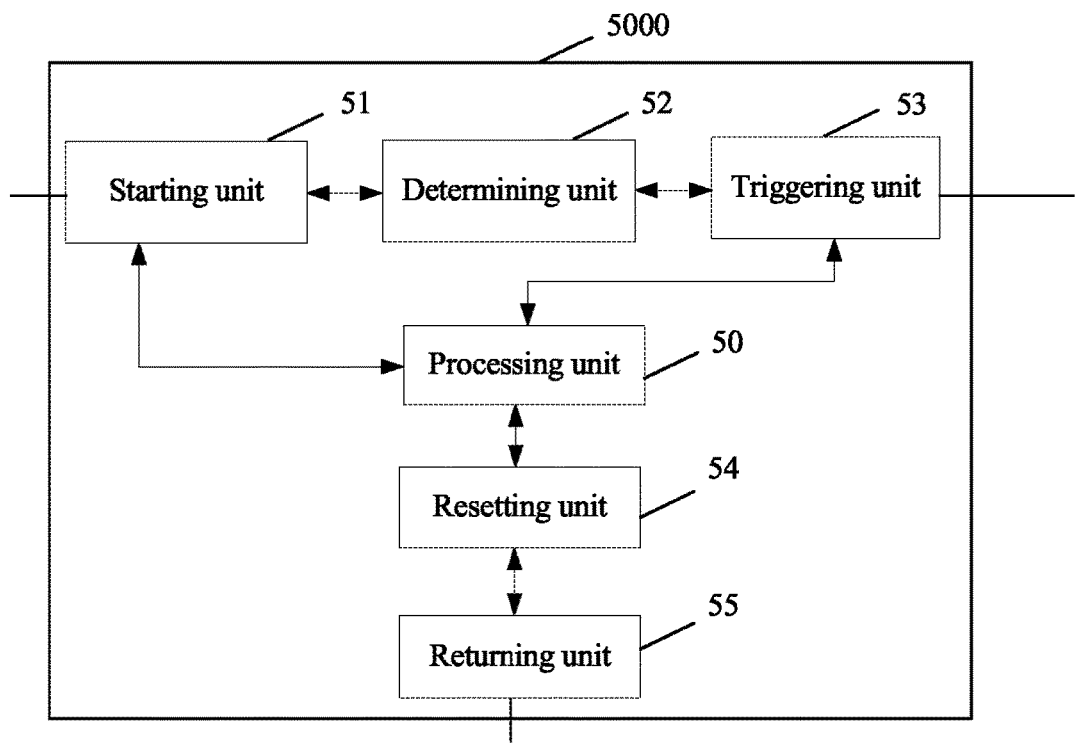
FIG. 5A is a schematic structural diagram of a terminal in an embodiment of the present invention.

Based on the technical solution of the foregoing corresponding method, referring to FIG. 5A, an embodiment of the present invention provides a schematic structural diagram of a terminal 5000, and the terminal 5000 includes: a processing unit 50, a starting unit 51, a determining unit 52, a triggering unit 53, a resetting unit 54, and a returning unit 55.

The processing unit 50 is configured to execute a circuit switched service in a first network that supports the circuit switched service.

The starting unit 51 is configured to start a timer after the processing unit 50 completes the execution of the circuit switched service once in the first network.

The determining unit 52 is configured to: after the starting unit 51 starts the timer, determine whether the circuit switched service needs to be executed again before the timer expires.

The triggering unit 53 is configured to: when the determining unit 52 determines that the circuit switched service needs to be executed again before the timer expires, stop the timer, and trigger the processing unit 50 to execute the circuit switched service again in the first network.

The resetting unit 54 is configured to reset the timer after the processing unit 50 completes the execution of the circuit switched service again.

The returning unit 55 is configured to: when it is determined that a preset condition is met, return to a second network that does not support the circuit switched service.

In this embodiment of the present invention, further, further includes a recording unit, where the recording unit is configured to record a quantity of delay times once after the determining unit 52 determines that the circuit switched service needs to be executed again before the timer expires, and before the processing unit 50 executes the circuit switched service again; or the recording unit is configured to record a quantity of delay times once after the processing unit 50 completes the execution of the circuit switched service again and before the returning unit 55 returns to the second network that does not support the circuit switched service.

In this embodiment of the present invention, optionally, the preset condition includes at least one of the following: the recorded quantity of delay times reaches a preset quantity of delay times, or duration recorded by the timer reaches preset delay duration; where the preset quantity of delay times refers to a quantity of times that the circuit switched service is allowed to be executed in the first network after the terminal completes the execution of the circuit switched service once and before the terminal returns to the second network.

In this embodiment of the present invention, further, before the starting unit 51 starts the timer, the determining unit 52 is further configured to: determine that a type of the terminal meets a preset type; or determine that the second network does not support at least one of a packet switched voice service or a supplementary service; or determine that a service type of the circuit switched service is a supplementary service.

In this embodiment of the present invention, further, before the starting unit 51 starts the timer, the determining unit 52 is further configured to: determine at least one of the preset delay duration or the preset quantity of delay times.

In this embodiment of the present invention, optionally, the starting unit 51 is specifically configured to: after the processing unit 50 completes the execution of the circuit switched service once in the first network, start the timer according to a received message that carries a delay instruction, where the delay instruction is used to instruct the terminal to delay returning to the second network.

In this embodiment of the present invention, optionally, the delay instruction includes one or any combination of the preset delay duration or the preset quantity of delay times.

In this embodiment of the present invention, further, further includes a sending unit, where the sending unit is configured to send a circuit switched service request message to a mobile switching center server, where the circuit switched service request message carries a circuit switched fallback instruction.

Figure 5B:
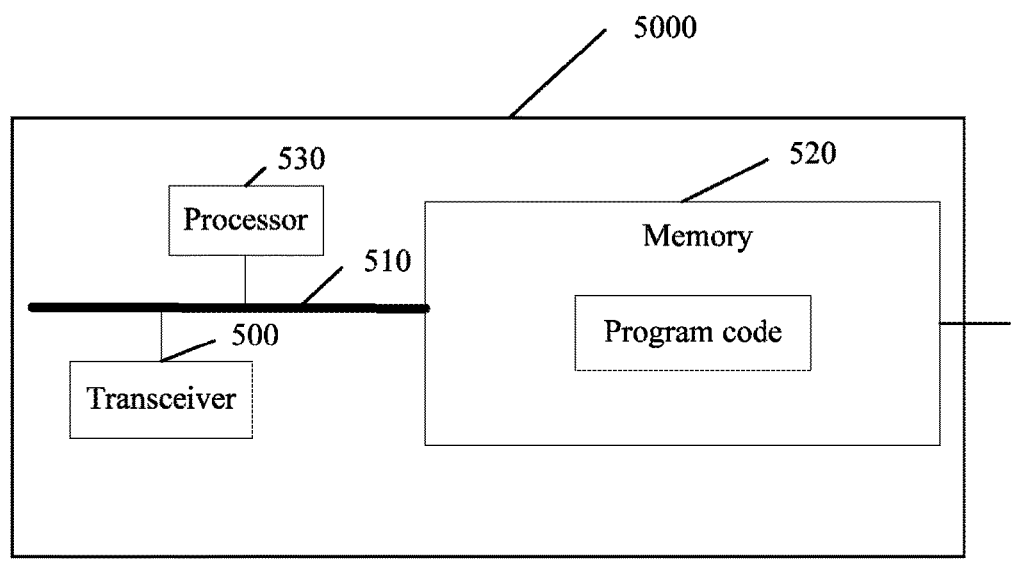
FIG. 5B is another schematic structural diagram of a terminal in an embodiment of the present invention.

As shown in FIG. 5B, FIG. 5B is a schematic structural diagram of a terminal 5000 according to an embodiment of the present invention, and the terminal 5000 includes a transceiver 500, a communications bus 510, a memory 520, and a processor 530.

The communications bus 510 is configured to connection and communication among the processor 530, the transceiver 500, and the memory 520.

The transceiver 500 is configured to implement communication between the terminal 5000 and the outside.

The memory 520 is configured to store program code.

The processor 530 is configured to invoke the program code stored in the memory 520, to execute the following operations: starting a timer after completing execution of a circuit switched service once in a first network that supports the circuit switched service; when determining that the circuit switched service needs to be executed again before the timer expires, stopping the timer, and executing the circuit switched service again in the first network; resetting the timer after completing the execution of the circuit switched service again; and when determining that a preset condition is met, returning to a second network that does not support the circuit switched service.

It should be understood that the terminal according to this embodiment of the present invention may be corresponding to the terminal in the foregoing communication method, and operations and/or functions of the modules in the terminal are respectively used to implement corresponding procedures of the method in FIG. IA. For brevity, details are not described herein.

In addition, a computer readable medium is further provided, including a computer readable instruction that executes, upon being executed, the following operation: executing operations of 100 to 130 in the method in the foregoing embodiment. Optionally, operations of optional steps in the method in the foregoing embodiment may be further executed.

In addition, a computer program product is further provided, including the foregoing computer readable medium.

After completing execution of a circuit switched service once in a first network, the terminal provided in this embodiment of the present invention camps on the first network for preset delay duration instead of immediately returning to a second network, may execute the circuit switched service at least one time again within the preset delay duration, and then returns to the second network when a preset condition is met, which avoids a process in which the terminal first returns from the first network to the second network after completing the execution of the circuit switched service each time, and then the terminal falls back from the second network to the first network to execute the circuit switched service again. Therefore, according to the foregoing technical solution, power consumption of the terminal can be reduced and a delay of the circuit switched service can be shortened.

Figure 6A:
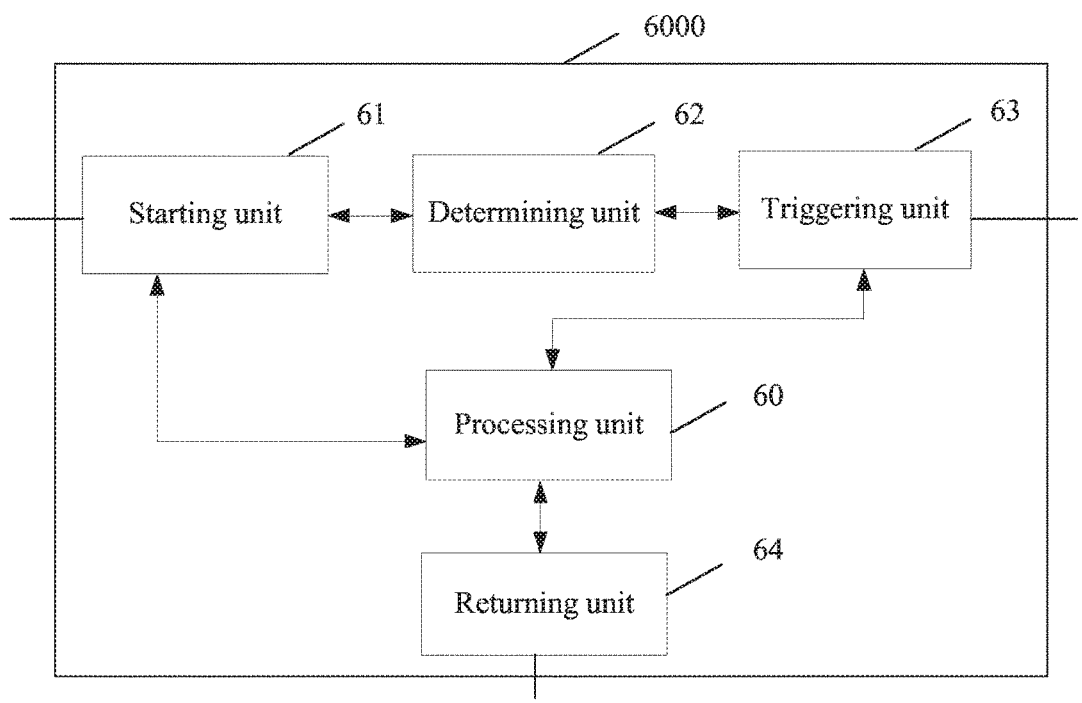
FIG. 6A is another schematic structural diagram of a terminal in an embodiment of the present invention.

Based on the technical solution of the foregoing corresponding method, referring to FIG. 6, an embodiment of the present invention provides a schematic structural diagram of a terminal 6000, and the terminal 6000 includes: a processing unit 60, a starting unit 61, a determining unit 62, a triggering unit 63, and a returning unit 64.

The processing unit 60 is configured to complete execution of a circuit switched service once in a first network that supports the circuit switched service.

The starting unit 61 is configured to start a timer after the processing unit 60 completes the execution of the circuit switched service in the first network.

The determining unit 62 is configured to: after the starting unit 61 starts the timer, determine whether the circuit switched service needs to be executed again before the timer expires.

The triggering unit 63 is configured to: when the determining unit 62 determines that the circuit switched service needs to be executed again before the timer expires, trigger the processing unit 60 to execute the circuit switched service again in the first network.

The returning unit 64 is configured to: when it is determined that the timer expires, return to a second network that does not support the circuit switched service.

In this embodiment of the present invention, further, the determining unit 62 is further configured to: determine that a type of the terminal meets a preset type; or determine that the second network does not support at least one of a packet switched voice service or a supplementary service; or determine that a service type of the circuit switched service is a supplementary service.

In this embodiment of the present invention, further, the determining unit 62 is further configured to: determine preset delay duration.

In this embodiment of the present invention, optionally, the starting unit 61 is specifically configured to: after the processing unit 60 completes the execution of the circuit switched service once in the first network, start the timer according to a received message that carries a delay instruction, where the delay instruction is used to instruct the terminal to delay returning to the second network.

In this embodiment of the present invention, optionally, the delay instruction includes the preset delay duration.

In this embodiment of the present invention, further, further includes a sending unit, where the sending unit is configured to send a circuit switched service request message to a mobile switching center server, where the circuit switched service request message carries a circuit switched fallback instruction.

Figure 6B:
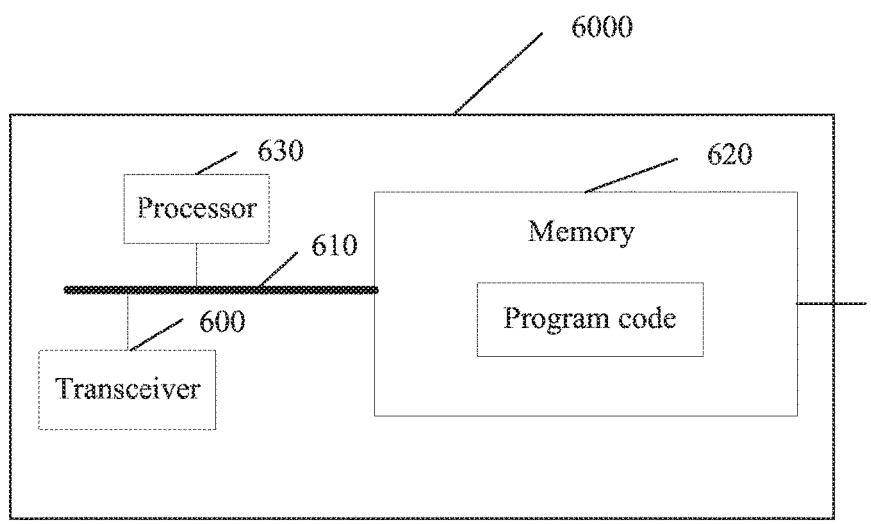
FIG. 6B is another schematic structural diagram of a terminal in an embodiment of the present invention.

As shown in FIG. 6B, FIG. 6B is a schematic structural diagram of a terminal 6000 according to an embodiment of the present invention, and the terminal 6000 includes a transceiver 600, a communications bus 610, a memory 620, and a processor 630.

The communications bus 610 is configured to connection and communication among the processor 630, the transceiver 600, and the memory 620.

The transceiver 600 is configured to implement communication between the terminal 6000 and the outside.

The memory 620 is configured to store program code.

The processor 630 is configured to invoke the program code stored in the memory 620, to execute the following operations: starting a timer after completing execution of a circuit switched service once in a first network that supports the circuit switched service; executing the circuit switched service again in the first network when determining that the circuit switched service needs to be executed again before the timer expires; and after completing the execution of the circuit switched service again and when determining that the timer expires, returning to a second network that does not support the circuit switched service.

It should be understood that the terminal according to this embodiment of the present invention may be corresponding to the terminal in the foregoing communication method, and operations and/or functions of the modules in the terminal are respectively used to implement corresponding procedures of the method in FIG. 1B. For brevity, details are not described herein.

In addition, a computer readable medium is further provided, including a computer readable instruction that executes, upon being executed, the following operation: executing operations of 1000 to 1200 in the method in the foregoing embodiment. Optionally, operations of optional steps in the method in the foregoing embodiment may be further executed.

In addition, a computer program product is further provided, including the foregoing computer readable medium.

After completing execution of a circuit switched service once in a first network, the terminal provided in this embodiment of the present invention camps on the first network for preset delay duration instead of immediately returning to a second network, may execute the circuit switched service at least one time again within the preset delay duration, and then returns to the second network when a preset condition is met, which avoids a process in which the terminal first returns from the first network to the second network after completing the execution of the circuit switched service each time, and then the terminal falls back from the second network to the first network to execute the circuit switched service again. Therefore, according to the foregoing technical solution, power consumption of the terminal can be reduced and a delay of the circuit switched service can be shortened.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A method, comprising:
   falling back, by a terminal, to a first network from a second network, wherein the first network supports circuit switched service, and the second network does not support circuit switched service;
   starting, by the terminal, a timer, after execution of an initial circuit switched service is completed in the first network;
   during a running of the timer, determining, by the terminal, when a preset condition is met;
   remaining, by the terminal, camped in the first network until it is determined by the terminal that the preset condition is met;
   while the terminal remains camped in the first network, resetting, by the terminal, the timer after each completed execution of a next circuit switched service that is started before expiration of the timer; and
   returning, by the terminal, to a second network, it is determined by the terminal that the preset condition is met;
   wherein the terminal determines that the preset condition is met:
   when the timer expires before an execution of a next circuit switched service has started; or
   when the next circuit switched service, which is executed prior to expiration of the timer, is a last circuit switched service for the terminal before returning to the second network.

2. The method according to claim 1, wherein the method further comprises:
   while the terminal remains camped in the first network, counting, by the terminal, each next circuit switched service to be executed before starting execution, wherein the last circuit switched service is determined according to a number of the next circuit switched services that have been counted.

3. The method according to claim 1, wherein the method further comprises:
   while the terminal remains camped in the first network, counting, by the terminal, each next circuit switched service after execution, wherein the last circuit switched service is determined according to a number of the next circuit switched services that have been counted.

4. The method according to claim 1, wherein starting the timer comprises:
   starting, by the terminal, the timer according to a delay instruction.

5. The method according to claim 4, wherein the delay instruction comprises a preset delay duration for the timer or a preset maximum number of next circuit switched services for the terminal before returning to the second network.

6. The method according to claim 1, wherein the method further comprises:
   determining, by the terminal, that a type of the terminal meets a preset type, before starting the timer.

7. The method according to claim 1, the method further comprises:
   determining, by the terminal, that the second network does not support a packet switched voice service or a supplementary service, before starting the timer.

8. The method according to claim 1, wherein the method further comprises:
   determining, by the terminal, that a service type of the first circuit switched service is a supplementary service, before starting the timer.

9. A method, comprising:
   falling back, by a terminal, to a first network from a second network to execute a first circuit switched service, wherein the first network supports circuit switched service, and the second network does not support circuit switched service;
   starting, by the terminal, a timer after execution of the first circuit switched service is completed in a first network, wherein the terminal remains camped during a running of the timer;
   while the terminal remains camped in the first network, executing, by the terminal, another circuit switched service in the first network before the timer expires; and
   determining, by the terminal, to return to a second network, after completing the execution of the other circuit switched service.

10. The method according to claim 9, wherein the method further comprises:
    determining, by the terminal, that a type of the terminal meets a preset type, before starting the timer.

11. The method according to claim 9, wherein the method further comprises:
    determining, by the terminal, that the second network does not support a packet switched voice service or a supplementary service, before starting the timer.

12. The method according to claim 9, wherein the method further comprises:
    determining, by the terminal, that a service type of the circuit switched service is a supplementary service, before starting the timer.

13. The method according to claim 9, wherein starting the timer comprises:
    starting, by the terminal, the timer according to a delay instruction.

14. A terminal, comprising:
    a processor; and
    a non-transitory computer readable storage medium storing a program for execution by the processor, the program including instructions to:
        fall back to a first network from a second network to execute a first circuit switched service, wherein the first network supports circuit switched service, and the second network does not support circuit switched service;
        start a timer after execution of the first circuit switched service is completed in a first network, wherein the terminal remains camped during a running of the timer;
        while the terminal remains camped in the first network, execute another circuit switched service in the first network before the timer expires; and
        determine to return to a second network, after completing the execution of the other circuit switched service.

15. The terminal according to claim 14, wherein the instructions further comprise instructions to:
    determine that a type of the terminal meets a preset type.

16. The terminal according to claim 14, wherein the instructions further comprise instructions to:
    determine that the second network does not support a packet switched voice service or a supplementary service.

17. The terminal according to claim 14, wherein the instructions further comprise instructions to:
    determine that a service type of the circuit switched service is a supplementary service.

18. The terminal according to claim 14, wherein the instructions further comprise instructions to:
    start the timer according to a delay instruction.

19. The method according to claim 2, wherein the last circuit switched service is determined when the number that has been counted is equal to or exceeds a predefined maximum number of the next circuit switched services to be executed before the terminal returns to the second network.

20. The method according to claim 3, wherein the last circuit switched service is a predefined last circuit switched service that is executed before the terminal returns to the second network.

* * * * *